(12) United States Patent
Zhao et al.

(10) Patent No.: US 11,194,339 B2
(45) Date of Patent: Dec. 7, 2021

(54) SMART FIXTURING SYSTEM AND METHOD

(71) Applicant: GM GLOBAL TECHNOLOGY OPERATIONS LLC, Detroit, MI (US)

(72) Inventors: Xiang Zhao, Novi, MI (US); Ningjian Huang, Bingham Farms, MI (US); Jinglin Li, Troy, MI (US); Jeffrey A. Abell, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 112 days.

(21) Appl. No.: 16/744,222

(22) Filed: Jan. 16, 2020

(65) Prior Publication Data

US 2021/0223782 A1 Jul. 22, 2021

(51) Int. Cl.
*G05D 1/02* (2020.01)
*B60P 1/64* (2006.01)

(52) U.S. Cl.
CPC .......... *G05D 1/0229* (2013.01); *B60P 1/6409* (2013.01); *G05D 1/0212* (2013.01); *G05D 1/0234* (2013.01)

(58) Field of Classification Search
CPC .............................. B60P 1/6409; B66F 9/063
See application file for complete search history.

(56) References Cited

U.S. PATENT DOCUMENTS

| | | | | |
|---|---|---|---|---|
| 2017/0308084 A1* | 10/2017 | Spicer | ................... | B62B 5/0083 |
| 2017/0313303 A1* | 11/2017 | Valtanen | .............. | G05D 1/0891 |
| 2020/0081438 A1* | 3/2020 | Vance | .................... | B25J 13/085 |
| 2020/0189120 A1* | 6/2020 | Weaver | .............. | G05B 19/4189 |
| 2020/0247201 A1* | 8/2020 | Fairclough | ........... | H01R 13/629 |

* cited by examiner

*Primary Examiner* — Aaron L Troost
(74) *Attorney, Agent, or Firm* — Lorenz & Kopf LLP

(57) ABSTRACT

Systems and methods are provided for determining and correcting autonomous transport imbalances. A transport vehicle operates over a route. A fixture plate is coupled to the transport vehicle by a joint to carry a payload. A sensor determines a position of the joint. A controller modifies the operation of the transport vehicle in response to a change in the position of the joint to correct imbalances.

20 Claims, 5 Drawing Sheets

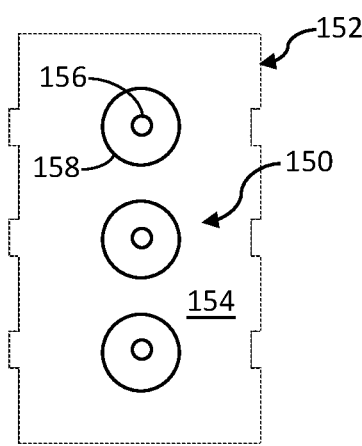
FIG. 8
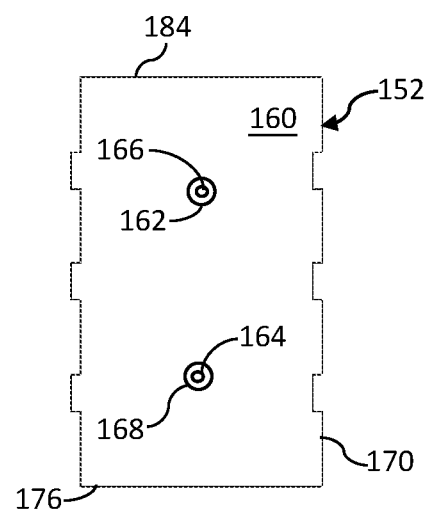
FIG. 9
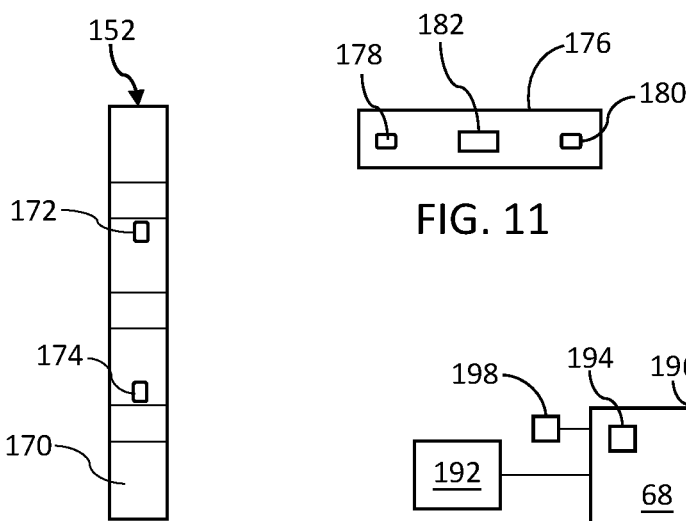
FIG. 10
FIG. 11
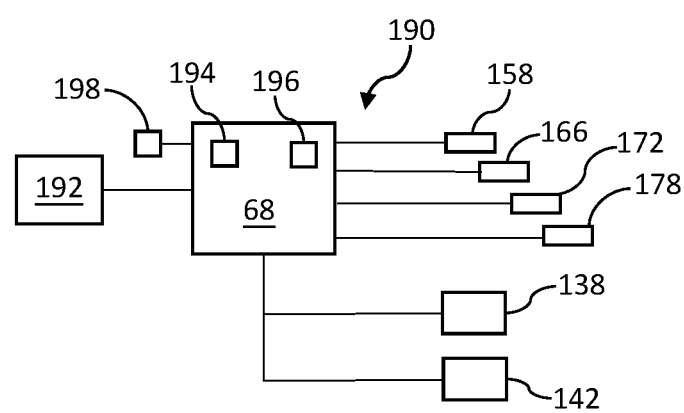
FIG. 12

SMART FIXTURING SYSTEM AND METHOD

INTRODUCTION

The present disclosure generally relates to transporting payloads such as by using automated vehicles, and more particularly relates to smart fixturing for moving items by automated vehicles while correcting imbalances that would otherwise be transmitted to the payload.

A variety of operations in logistics, manufacturing and general material handling involve moving payloads that may include materials and objects from one location to another. Automated guided vehicles (AGV) have been used to automatically move things with limited or no direct human guidance. AGVs may follow a predesignated route such as by following a floor embedded wire/tape or may preprogrammed to follow the route. Typically, an AGV individually carries out its designated tasks. Greater flexibility and capability in moving payloads such as by AGV type devices is desired to increase effectiveness and/or efficiency.

Accordingly, it is desirable to provide systems and methods that enable more effective and efficient material/object movement by transport vehicles such as AGVs. Furthermore, other desirable features and characteristics of the present invention will become apparent from the subsequent detailed description and the appended claims, taken in conjunction with the accompanying drawings and the foregoing technical field and introduction.

SUMMARY

Systems and methods are provided for determining and correcting autonomous transport imbalances. At least one transport vehicle operates over a route. To carry a payload, a fixture plate is coupled to the transport vehicle by a joint. A sensor determines a position of the joint. At least one controller modifies the operation of the transport vehicle in response to a change in the position of the joint to correct imbalances.

In additional embodiments, the fixture plate includes a linking system to align the fixture plate with a second fixture plate in one of a number of alternate orientations.

In additional embodiments, the linking system includes tabs and slots.

In additional embodiments, the fixture plate includes a pressure sensor. The controller uses a signal from the pressure sensor to determine whether the payload is correctly loaded.

In additional embodiments, the fixture plate includes a locator to locate the payload on the fixture plate. The pressure sensor is positioned at the locator.

In additional embodiments, the fixture plate includes a number of distance sensors to sense proximity of obstacles around the fixture plate.

In additional embodiments, the fixture plate includes an electrical connector to couple with an adjacent fixture plate.

In additional embodiments, the controller calculates a pose error of the fixture plate.

In additional embodiments, the controller generates a motion control signal of the transport vehicle to minimize the pose error.

In additional embodiments, the controller changes velocity of the transport vehicle based on the pose error.

In a number of other embodiments a method includes operating a transport vehicle over a route; coupling a fixture plate to the transport vehicle by a joint; carrying a payload on the fixture plate; determining, by a sensor, a position of the joint; and modifying the operation of the transport vehicle in response to a change in the position of the joint.

In additional embodiments, a method includes aligning the fixture plate with a second fixture plate in one of a number of alternate orientations using a linking system.

In additional embodiments, a method includes forming the linking system as tabs and slots.

In additional embodiments, a method includes using a signal from a pressure sensor to determine whether the payload is correctly loaded.

In additional embodiments, a method includes locating the payload on the fixture plate using the locator, where the pressure sensor is positioned at the locator.

In additional embodiments, a method includes using distance sensors to determine proximity of obstacles around the fixture plate.

In additional embodiments, a method includes coupling the fixture plate with an adjacent fixture plate by an electrical connector.

In additional embodiments, a method includes calculating a pose error of the fixture plate.

In additional embodiments, a method includes generating a motion control signal of the transport vehicle to minimize the pose error; and changing a velocity of the transport vehicle based on the pose error.

In a number of additional embodiments, a fixturing system includes two or more autonomous transport vehicles where each has a joint coupling a fixture plate to the autonomous transport vehicle. Each fixture plate includes a number of sensors to sense observable conditions related to the fixture plate. A linking system aligns the fixture plates in one of a number of alternate orientations. A controller modifies the operation of the autonomous transport vehicles in response to a change in a position of at least one of the first and second joints to correct imbalances.

BRIEF DESCRIPTION OF THE DRAWINGS

The exemplary embodiments will hereinafter be described in conjunction with the following drawing figures, wherein like numerals denote like elements, and wherein:

FIG. 8 is a schematic, bottom view of a fixture plate showing details of a sensor suite, in accordance with various embodiments;

FIG. 9 is a schematic, top view of a fixture plate showing details of a sensor suite, in accordance with various embodiments;

FIG. 10 is a schematic, side view of a fixture plate showing details of a sensor suite, in accordance with various embodiments;

FIG. 11 is a schematic, end view of a fixture plate showing details of a sensor suite, in accordance with various embodiments;

FIG. 12 is a control system diagram for the fixturing system of FIG. 1, in accordance with various embodiments.

DETAILED DESCRIPTION

Figure 1:
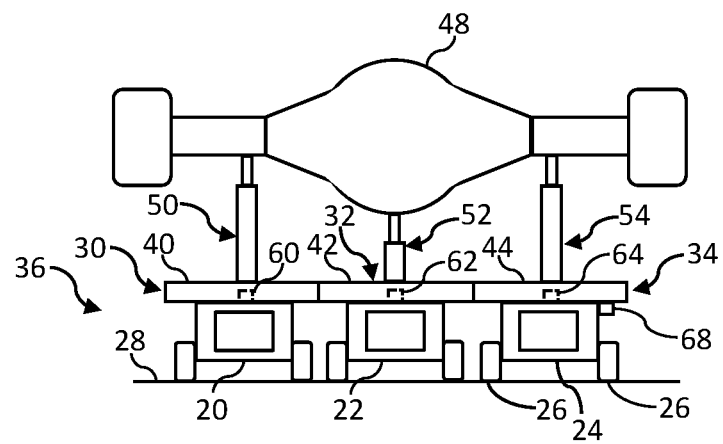
FIG. 1 schematically illustrates, in elevation view, a swarm of autonomous transport vehicles with fixturing systems including fixture plates carrying a payload, in accordance with various embodiments.

The following detailed description discloses embodiments that are examples that are not intended to limit the application and its uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of steering systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As described herein, disclosed system and method embodiments add flexibility to use of low cost and/or generic autonomous transport vehicles such as AGVs and autonomous mobile robots (AMRs) in a wide range of applications individually and in swarms. The employed AGVs/AMRs may have limited computing power while the capabilities of the disclosed fixturing systems may correct imbalances for securely move payloads of various configurations. For example, one or more fixture plates are reconfigurable to support various types of payloads. Sensors/encoders provide information of the relative positions/angles between the autonomous transport vehicles and their associated fixture plates, which is used to dynamically adjust operation of the autonomous transport vehicles to compensate for variations during a mission to avoid damage to the payload. In some embodiments, the individual relative positions/angles of the fixture plates may be modified to further correct imbalances or to adjust for variations. In a variety of embodiments, the fixture plates may include distance/proximity sensors to determine the presence of obstacles and/or to determine distances to loading or processing locations. The fixture plates may also have a type of load sensors to verify correct loading of the payload and/or to balance loads for stable transportation. The fixture plates may be modular and may be linked to other fixture plates in any number of configurations to enable a flexible and scalable platform to accommodate various payloads.

An embodiment as illustrated in FIG. 1 may include a number of autonomous transport vehicles 20, 22, 24 working in concert. Example transport vehicles may generally be autonomous in their mission such as to navigate a route between various locations while carrying the payload. In various embodiments, an autonomous transport vehicle 20, 22, 24 may operate on its own to complete a mission or may be grouped with a number of other autonomous transport vehicles 20, 22, 24 in a swarm, which may be formed in real-time depending on requirements of a given mission. In a number of embodiments, parameters such as payload size, shape, weight, and/or locating position(s) may be used to determine a footprint of the swarm, the number of autonomous transport vehicles needed for the mission, and/or positioning of the autonomous transport vehicles relative to one another. The autonomous transport vehicles 20, 22, 24, etc. may navigate autonomously through the mission, communicating with each other and with other devices. The fixture plate systems and methods described herein may be used with various autonomous transport vehicles including those described in pending U.S. patent application Ser. No. 16/124,329 filed Sep. 9, 2018 and entitled Real-Time Formed Robotic Swarm for Material Handling, which is assigned to the Assignee of the current application and which is specifically incorporated herein by reference.

Figure 2:
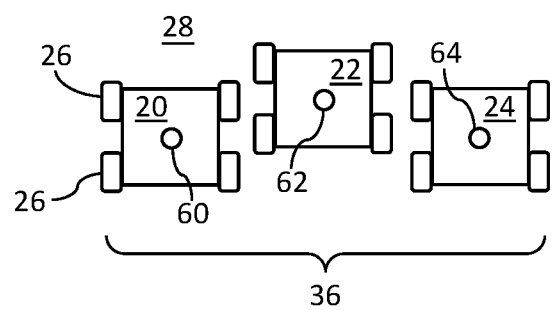
FIG. 2 is a schematic, plan view of the autonomous transport vehicles of FIG. 1 with the fixture plates and payload omitted for clarity.

Referring to FIG. 2 along with FIG. 1, each autonomous transport vehicle 20, 22, 24 includes a number of wheels 26 to travel upon a surface such as a floor 28. In the current embodiment, the autonomous transport vehicles 20, 22, 24 form a swarm 36 of three. It should be understood that in various embodiments a swarm may contain any number of autonomous transport vehicles 20, 22, 24 suitable for carrying the payload of a designated mission. As the swarm 36 moves over the floor 28, or any other surface that it may traverse, position or formation variation between the individual autonomous transport vehicles 20, 22, 24 may occur such as due to imperfect operation, uneven spots on the floor 28, cornering, or other factors. As described herein, the autonomous transport vehicles 20, 22, 24 each carries a fixturing system 30, 32, 34 respectively, that provides a number of advantages including helping to compensate for the variations to maintain a consistent support system for the payload. As described herein, advantages may result so that the payload is protected and securely transported. Each of the fixturing systems 30, 32, 34 is flexible, such as by including a fixture plate 40, 42, 44 respectively, that is tailorable to the payload to be carried and each may have aspects that vary between the various autonomous transport vehicles 20, 22, 24 with which they are associated. In the current embodiment, the swarm 36 is configured to carry an axle assembly 48 for a vehicle (not shown) as an example, with the fixturing system 32 being set up differently than the fixturing systems 30, 34 to accommodate the shape of the axle assembly 48. For example, the fixturing system 32 includes a support 52 that is set up differently than the supports 50, 54. Each unit also includes a joint 60, 62, 64 between a respective autonomous transport vehicle 20, 22, 24 and its respective fixture plate 40, 42, 44 that is dynamic as further described below.

At least one controller 68 is included to interface with, and to control, various aspects and functions including those of the fixturing systems 30, 32, 34. The controller(s) 68 may also control various aspects of one or more of the autonomous transport vehicles 20, 22, 24. In a number of embodiments, each autonomous transport vehicle 20, 22, 24 may have a separate controller (not shown). When operating in the swarm 36, one autonomous transport vehicle 20, 22, 24 may operate as a lead vehicle to coordinate control. In a number of embodiments, the controller(s) 68 may be a number of interfaced controllers with one carried by each of the fixture plates 40, 42, 44. In a number of additional embodiments, the controller(s) 68 may be a plug-n-play unit that is coupled to one of the fixture plates 40, 42, 44 during setup. In a number of additional embodiments, the controller(s) 68 may be remote and may couple with the swarm 36 wirelessly or through other methods. Aspects of the controller(s) are further described below.

Figure 3:
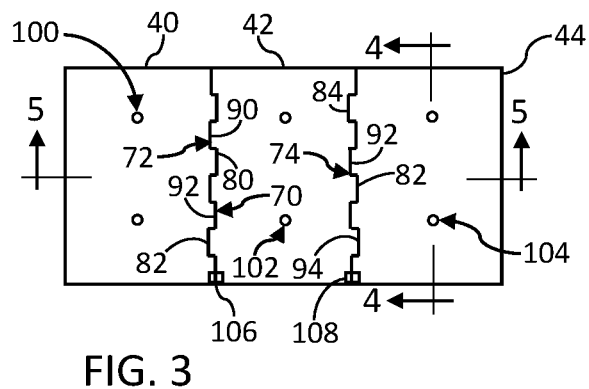
FIG. 3 is a schematic, plan view of the fixture plates of FIG. 1 without a payload, in accordance with various embodiments.

Referring to FIG. 3, an embodiment of the fixture plates 40, 42, 44 shows that each has a linking system 70, 72, 74, through which the fixture plates 40, 42, 44 may engage one another in a number of configurations. The linking systems 70, 72, 74 allow the fixture plates 40, 42, 44 to engage one another in different configurations and to readily separate upon the completion of a mission. For example, to begin a mission, the autonomous transport vehicles 20, 22, 24 associated with the fixture plates 40, 42, 44 may drive toward one another to engage in a configuration suitable for the payload. As part of the linking systems 70, 72, 74, the tabs 80 of the fixture plate 40 engage into the slots 92 of the fixture plate 42. Also, the tabs 82 of the fixture plate 42 engage into the slots 90 of the fixture plate 40 and engage into the slots 94 of the fixture plate 44. In addition, the tabs 84 of the fixture plate 44 engage into the slots 92 of the fixture plate 42. The linking systems 70, 72, 74 assist in aligning the fixture plates 40, 42, 44 but in this embodiment do not lock the fixture plates 40, 42, 44 together. Accordingly, upon completion of the mission the fixture plates 40, 42, 44 may readily separate and the associated autonomous transport vehicles 20, 22, 24 may separate and operate independent of one another to move to their next mission.

The fixture plates 40, 42, 44 include a number of locators 100, 102, 104 for setting up supports tailored to various payloads. The locators 100, 102, 104 may take a variety of forms such as pegs, holes, slots, etc. and may be distributed as needed across the top or other surfaces of the fixture plates 40, 42, 44. The fixture plates 40, 42, 44 may include mating electrical connectors 106, 108 for automatically coupling electrical features when the fixture plates 40, 42, 44 are brought together at the start of a mission.

Figure 4:
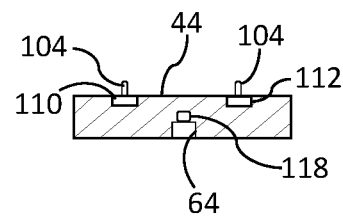
FIG. 4 is a schematic, sectional view taken generally through the line 4-4 indicated in FIG. 3, in accordance with various embodiments.
Figure 5:
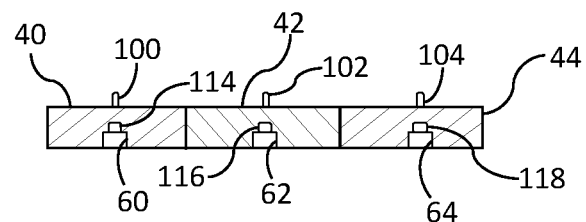
FIG. 5 is a schematic, sectional view taken generally through the line 5-5 indicated in FIG. 3, in accordance with various embodiments.

Referring additionally to FIG. 4, pressure sensors 110, 112 are associated with the locating features 104 as an example, for determining loading of the payload as further described below. In addition, as shown in FIG. 5. Sensors such as encoders 114, 116, 118 are each positioned adjacent a respective joint 60, 62, 64 for measuring position and inclination of the fixture plates 40, 42, 44 relative to their respective autonomous transport vehicle 20, 22, 24 as further described below. The encoders 114, 116, 118 may be embedded in their respective fixture plate 40, 42, 44 or may otherwise be mounted to determine relative position and inclination. In a number of embodiments, the encoders 114, 116, 118 may be any sensor that converts position and/or angle changes to electronic signals in real time.

Figure 6:
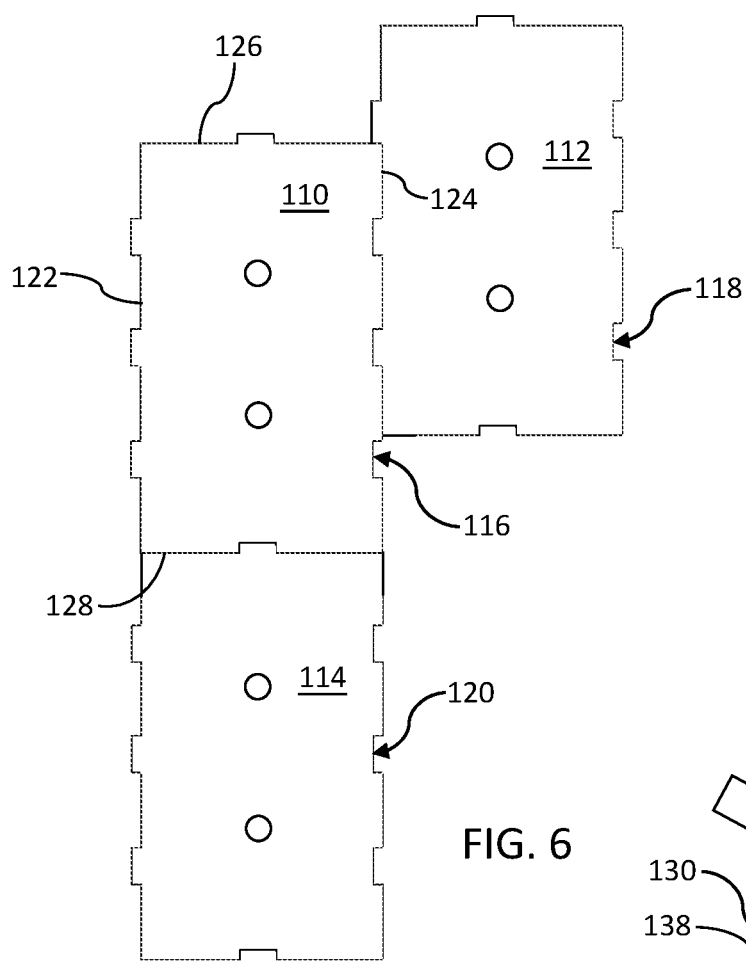
FIG. 6 is a schematic, plan view of a group of reconfigurable fixture plates, in accordance with various embodiments.

As shown in FIG. 6, fixture plates 110, 112, 114 are configured with linking systems 116, 118, 120 respectively, that enable further flexibility in relative positioning. In this example, each fixture plate has tabs and slots at each side and at each end. For example, fixture plate 110 has tabs and/or slots on side 122 and on side 124. In addition, fixture plate 110 has tabs and/or slots on end 126 and on end 128. Fixture plates 112, 114 are similarly configured. As a result, fixture plates 110, 112, 114 may engage each other on either or both of their sides and/or ends. It should be appreciated that while the current example includes fixture plates that are generally rectangular in shape, other embodiments may include fixture plates of any other shape, such as polygonal, rounded, curved, etc., as appropriate for the payloads that will be transported. In addition, while tabs and slots are included in this example, other shapes may be used for the linking systems such as straight edges, or features that are rounded, curved, angled, etc., as is appropriate for releasably aligning the fixture plates 110, 112, 114 to carry the designated payloads.

Figure 7:
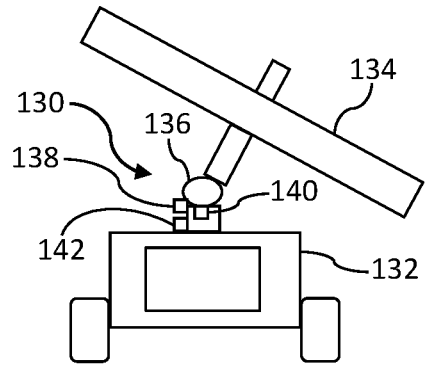
FIG. 7 schematically illustrates, in elevation view, an autonomous transport vehicle with fixture plate and interposed repositionable linkage joint, in accordance with various embodiments.

As shown schematically in FIG. 7, a linkage joint system 130 is illustrated which may be used for the joints 60, 62, 64. The linkage joint system 130 in this example provides flexibility and advanced capability to the joint between the autonomous transport vehicle 132 and the fixture plate 134. The fixture joint system 130 includes a joint 136 that provides a number of degrees of freedom between the fixture plate 134 and the autonomous transport vehicle 132. The joint 136 may be configured as a hinge, a ball and socket, a universal joint, or other mechanism to allow pivoting and/or rotation of the fixture plate 134 relative to the autonomous transport vehicle 132. In a number of embodiments, the joint 136 may be passive, may move in response to applied forces, and may be biased, such as under spring action, to return to a base position. In a number of other embodiments, an actuator 138 may be used to automatically and dynamically position the joint 136 and may employ gears, tapes, screws, linkage, electro-magnetism, or other mechanisms to effect movement. An encoder 140 provides a signal to determine relative position and/or angle. In this embodiment, a second actuator 142 is included to vary height of the fixture plate 134 relative to the autonomous transport vehicle 132. The encoder 140 may provide data on the relative height or a separate sensor may be employed. The linkage joint system 130 enables real-time compensation for variables that may arise due to factors such as operating surface variations and formation deviation in the swarm 36. Compensation may be effected by varying operation of the autonomous transport vehicle 132 for correction and/or through actuation of the joint 136. In a number of embodiments, active compensation enables the use of lower cost autonomous transport vehicles that may be built to more lenient specifications with less precise operating tolerances.

Referring to FIGS. 8-11, a sensor suite 150 is shown for the fixture plate 152, the aspects of which are applicable to other fixture plates such as the fixture plates 40, 42, 44. In FIG. 8 the top 154 of the fixture plate 152 is shown, which corresponds to the surface upon which the payload is carried. Each locator 156 is surrounded by a pressure sensor 158 for mapping pressure on the fixture plate 152 from the payload. Each locator 156 defines a loading zone through which the weight of the payload is transferred to the fixture plate 152. Any number of loading zones may be included and so in some embodiments the top 154 of the fixture plate may be substantially covered with a pressure sensitive film or layer for mapping the load on the fixture plate 152. The expected pressure profile of a given payload may be predetermined for each fixture plate in the swarm based on factors such as weight, size/footprint, and locating scheme for balanced loading on the autonomous transport vehicles. In this embodiment, the pressure measurement signals from the pressure sensors 158 are used to verify the loaded position of the payload by comparing the predetermined pressure profile to the actual pressure profile determined from the pressure sensors 158. When variations arise between actual loaded payload positions as reflected by the pressures and the predetermined profile. and where the variations exceed a given specification/tolerance, the loading is considered as imbalanced. When an imbalanced loading occurs, an alarm or other indicator may be delivered to indicate a re-loading is needed and/or the loaded swarm may be programmed to not move.

As illustrated in FIG. 9 the bottom 160 of the fixture plate 152 is shown, which corresponds to the surface that faces the associated autonomous transport vehicle 20, 22, 24. In this embodiment, each of the joints 162, 164 for coupling with the autonomous transport vehicle 20, 22, 24 includes a sensor, which in this example is an encoder 166, 168, respectively. The encoders 166, 168 measure position/angle of the fixture plate 152 relative to its respective autonomous transport vehicle 20, 22, 24 to enable control to maintain alignment between the various fixture plates in the given swarm and to limit stresses on the payload as further described below.

In FIG. 10, a side 170 of the fixture plate is illustrated, which may be a side that mates with other fixture plates in the swarm or which may be on the outside of the fixture plates in the swarm. The side 170 includes distance sensors 172, 174, which may be embedded or may be plug-in for inclusion as needed to sense the proximity of objects. The distance sensors 172, 174 may be ultrasonic, electromagnetic or another type. In a number of embodiments the distance sensors 172, 174 are employed to determine the proximity of other objects such as other fixture plates during formation of the swarm, obstacles in the path, and/or structures at destinations. FIG. 11 illustrates the end 176 of the fixture plate 152 which also similarly includes distance sensors 178, 180. In addition end 176 includes a navigation sensor 182 for use by the associated autonomous transport vehicle 20, 22, 24 in self-navigated using LIDAR, RADAR, cameras or other visual navigation devices facilitating three-dimensional vision. The end 184 of the fixture plate 152 may be configured similar to the end 176.

General aspects of a control system 190 for the fixturing system 30, 32, 34 are depicted in FIG. 12. The control system 190 generally includes the controller 68, the sensors 158, 166, 172 and 178, the actuators 138, 142 and other interfacing controller(s) 192. The controller 68 may receive various signals from the sensors 158, 166, 172 and 178, send control signals to the actuators 138, 142, and may interface with the other controller(s) 192 such as of the autonomous transport vehicles 20, 22, 24, other fixture plates and/or others. In a number of embodiments, other sensors that sense observable conditions related to the fixture plates 40, 42, 44 and/or the fixturing systems 30, 32, 34 may be included. The controller 68 is communicatively coupled to receive input signals from the various sensors, which are configured to generate the signals in proportion to various physical parameters. In general, the controller 68 may use the sensed values to generate output signals for delivery to various controlled devices. The controller 68 may comprise any number of electronic control modules and is configured to receive information from various sources, process that information, and provide control signals/commands based thereon to effect outcomes such as operation of the actuators 138, 142. In the depicted embodiment, the controller 68 includes a processor 194 and a memory device 196, and may include or may be coupled with a storage device 198. The processor 194 performs the computation and control functions of the controller 68, and may comprise any type of processor or multiple processors, single integrated circuits such as a microprocessor, or any suitable number of integrated circuit devices and/or circuit boards working in cooperation to accomplish the functions of a processing unit. During operation, the processor 194 executes one or more programs and may use data, each of which may be contained within the storage device 198 and as such, the processor 194 controls the general operation of the controller 68 in executing the processes described herein, such as the processes described herein, including below in connection with FIG. 13.

The memory device 196 may be any type of suitable memory. For example, the memory device 196 may include volatile and nonvolatile storage in read-only memory (ROM), random-access memory (RAM), and keep-alive memory (KAM), for example. KAM may comprise a persistent or non-volatile memory that may be used to store various operating variables while the processor 194 is powered down. The memory device 196 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 68. In certain embodiments, the memory device 196 may be located on and/or co-located on the same computer chip as the processor 194. In the depicted embodiment, the memory device 196 may store the above-referenced programs along with one or more stored values of the data such as for short-term data access.

The storage device 198 stores data, such as for long-term data access for use in automatically controlling the fixturing system 30, 32, 34 and its related systems. The storage device 198 may be any suitable type of storage apparatus, including direct access storage devices such as hard disk drives, flash systems, floppy disk drives and optical disk drives. In one exemplary embodiment, the storage device 198 comprises a source from which the memory device 196 receives the programs that execute one or more embodiments of one or more processes of the present disclosure, such as the steps of the process (and any sub-processes thereof) described further herein, including below in connection with FIG. 13. In another exemplary embodiment, the programs may be directly stored in and/or otherwise accessed by the memory device 196. The programs represent executable instructions, used by the electronic controller 68 in processing information and in controlling the fixturing system 30, 32, 34 and related systems. The instructions may include one or more separate programs, each of which comprises an ordered listing of executable instructions for implementing logical functions. The instructions, when executed by the processor 194 support the receipt and processing of signals such as from the various sensors, and the performance of logic, calculations, methods and/or algorithms for automatically controlling the components and systems of the fixturing system 30, 32, 34. The processor 194 may generate control signals for automatic control based on the logic, calculations, methods, and/or algorithms. As will be appreciated, the data storage device 198 may be part of the controller 68, separate from the controller 68, part of one or more other controllers, or part of multiple systems. The memory device 196 and the data storage device 198 work together with the processor 194 to access and use the programs and the data. While the components are depicted as being part of the same system, it will be appreciated that in certain embodiments, these features may comprise multiple systems.

In a number of embodiments, the controller 68 and/or the controller(s) 192 may determine operational changes for the autonomous transport vehicles 20, 22, 24 to correct imbalances in their operation in the swarm 36. In a number of additional embodiments, the controller 68 may determine adjustments to the positioning of the fixture plates 40, 42, 44 relative to their respective autonomous transport vehicles 20, 22, 24 such as by using the input signals from the encoders 166, 168 and adjusting the actuators 138, 142.

Figure 13:
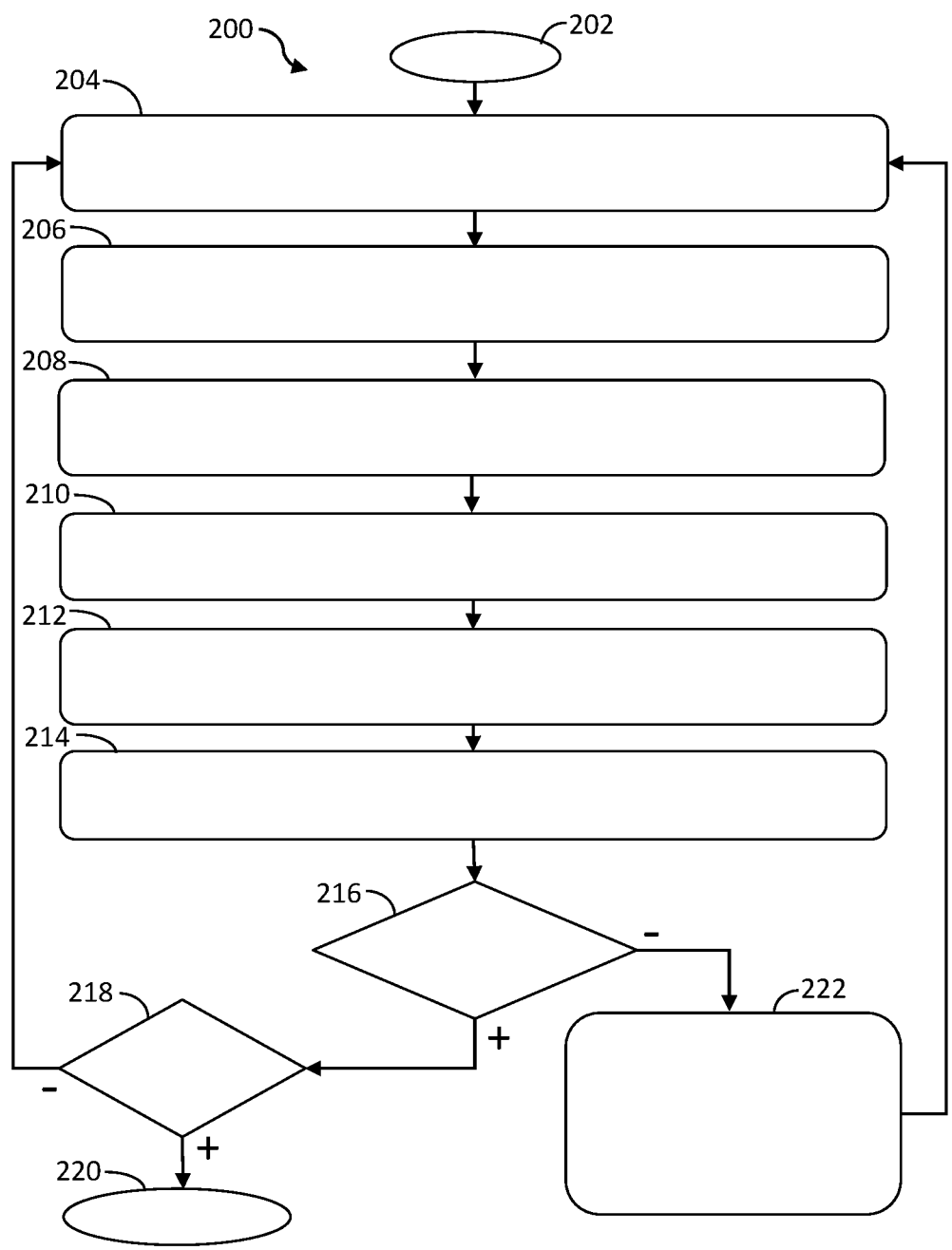
FIG. 13 is a flow chart of a method of linkage joint control for an AMR, in accordance with various embodiments.

Referring additionally to FIG. 13, illustrated in flow chart form is a process 200 such as may be carried out by the controller 68, to maintain positioning between the fixture plate 40, 42, 44 due to instabilities that arise because of variation/imperfect operation of the autonomous transport vehicles 20, 22, 24. The process 200 begins 202, such as when the swarm 36 is formed at the beginning of a mission. In the process 200 the following parameters may be used wherein:

v is present control velocity of the autonomous transport vehicle

θ is present linkage encoder reading

F is fixture plate coordinate frame $p_f$ is autonomous transport vehicle pose w.r.t the fixture plate frame $lp_f$ is leader autonomous transport vehicle pose w.r.t the fixture plate frame $p_l$ is present autonomous transport vehicle pose w.r.t the leader robot frame $des_{pl}$ is desired autonomous transport vehicle pose w.r.t the leader robot frame; and $e_p$ is autonomous transport vehicle pose error to its desired position.

The process 200 proceeds and various sensor signals are read 204, including the encoders 114, 116, 118 and other inputs are received such as from the other controller(s) 192, such as the velocity of the autonomous transport vehicle 20, 22, 24. The autonomous transport vehicle pose is computed 206 by the controller 68 in the frame of the fixture plate 40, 42, 44 based on linkage kinematics where $p_f$=Link(θ). Each fixture plate 40, 42, 44 is transformed 208 by the controller 68 from the respective fixture plate frame into the frame of the leader autonomous transport vehicle using $p_l=(lp_f)^{-1}*p_f$. The present autonomous transport vehicle pose error is calculated 210 by the controller 68 using $e_p=des_{pl}-p_l$. The pose error $e_p$ is communicated 212 to the controller(s) 192 for motion control of the autonomous transport vehicle 20, 22, 24. The controller(s) 192 that control motion of the autonomous transport vehicle 20, 22, 24 may generate 214 a new motion control $v_{new}$ value to minimize the pose error $e_p$ toward zero.

The process 200 proceeds and compares $v_{new}$ to acceptable velocities to determine 216 whether it is within constraints. When the determination 216 is positive, the process 200 proceeds to determine 218 whether the pose of the autonomous transport vehicle 20, 22, 24 reaches the targeted location. When the determination 218 is positive, the process 200 ends 220 until a new cycle is initiated. When the determination 218 is negative, the process 200 returns to step 204 and proceeds therefrom. Returning to step 216, when the determination is negative, the swarm 36 is stopped 222 for a designated time for the swarm 36 formation to become stable and the process returns to step 204 and proceeds therefrom.

Through the foregoing embodiments, systems and methods transport payloads autonomously and may determine imbalances and make corrections. Imbalances may be corrected when they arise due to imperfect operation of the autonomous transport vehicles or from other factors. Through the imbalance corrections that are made, payloads are transported securely, including when using commodity type AGVs/AMRs with limited computing power.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system comprising:
  a number of transport vehicles configured to operate in concert, the number of transport vehicles including a first transport vehicle and a second transport vehicle, the number of transport vehicles configured to operate over a route;
  a first fixture plate configured to carry a payload;
  a first joint moveably coupling the first fixture plate to the first transport vehicle;
  a second fixture plate configured to carry the payload and to electrically link with the first fixture plate;
  a second joint moveably coupling the second fixture plate to the second transport vehicle;
  a first electrical coupler on the first fixture plate;
  a second electrical coupler on the second fixture plate, the first and second electrical couplers electrically couple the first fixture plate with the second fixture plate, and communicate information, including through the first and second fixture plates;
  a first sensor disposed at the first joint and configured to determine a first position of the first joint;
  a second sensor disposed at the second joint and configured to determine a second position of the second joint;
  at least one controller on the first and second fixture plates and configured to modify the operation of the number of transport vehicles in response to a change in at least one of the first position and the second position to compensate for transport variations to maintain a consistent support of the payload by locating the first and second fixture plates relative to each other, the at least one controller coupled with a vehicle controller on the number of transport vehicles.

2. The system of claim 1, wherein the first and second fixture plates include a linking system configured to align the first fixture plate with the second fixture plate in one of a number of alternate orientations, wherein the linking system includes interlocking tabs and slots defined by the first and second fixture plates.

3. The system of claim 2, wherein the tabs and slots are unlocked and continuously releasable.

4. The system of claim 1, wherein the first fixture plate includes a pressure sensor, and wherein the at least one controller is configured, using a signal from the pressure sensor, to determine whether the payload is correctly loaded.

5. The system of claim 4, wherein the first fixture plate includes a locator configured to locate the payload on the first fixture plate, wherein the pressure sensor is positioned at the locator.

6. The system of claim 1, wherein the first fixture plate includes a number of distance sensors configured to sense proximity of obstacles around the first fixture plate.

7. The system of claim 1, wherein the at least one controller is configured to:
maintain positioning between the first and second fixture plates:
read the first and second sensors;
compute a pose of the second transport vehicle in a frame of the second fixture plate;
transform the pose from the frame of the second fixture plate into a frame of the first transport vehicle as a lead vehicle;
calculate a pose error of the second transport vehicle for motion control;
generate a motion control value to minimize the pose error toward zero; and
operate, using the motion control value, the second transport vehicle.

8. The system of claim 1, wherein the at least one controller is configured to calculate a pose error of the second fixture plate.

9. The system of claim 8, wherein the at least one controller is configured to generate a motion control signal of the second transport vehicle to minimize the pose error.

10. The system of claim 9, wherein the at least one controller is configured, based on the pose error, to change velocity of the second transport vehicle to a new velocity, and to determine whether the new velocity is within constraints.

11. A method comprising:
operating a number of transport vehicles in concert over a route, the number of transport vehicles including a first transport vehicle and a second transport vehicle;
coupling, moveably, a first fixture plate to the first transport vehicle by a first joint and a second fixture plate to the second transport vehicle by a second joint;
electrically coupling, by a first electrical coupler on the first fixture plate and a second electrical coupler on the second fixture plate, the first fixture plate with the second fixture plate;
communicating information by the first and second electrical couplers, including through the first and second fixture plates
carrying a payload on the first and second fixture plates;
determining, by a first sensor disposed at the first joint and a second sensor disposed at the second joint, a first position of the first joint and a second position of the second joint;
coupling at least one controller with a vehicle controller on the number of transport vehicles; and
modifying, by the at least one controller on the first and second fixture plates, the operation of the number of transport vehicles in response to at least one of the first position and the second position to compensate for transport variations to maintain a consistent support of the payload by locating the first and second fixture plates relative to each other.

12. The method of claim 11, wherein the first and second fixture plates include a linking system and comprising aligning the first fixture plate with the second fixture plate in one of a number of alternate orientations; and forming the linking system with interlocking tabs and slots defined by the first and second fixture plates.

13. The method of claim 12, comprising maintaining the linking system as continuously releasable with the tabs and slots unlocked.

14. The method of claim 11, wherein the first fixture plate includes a pressure sensor and comprising determining, by the at least one controller using a signal from the pressure sensor, whether the payload is correctly loaded.

15. The method of claim 14, wherein the first fixture plate includes a locator, wherein the pressure sensor is positioned at the locator, and comprising locating the payload on the first fixture plate using the locator.

16. The method of claim 11, wherein the first fixture plate includes a number of distance sensors, and comprising sensing, using the number of distance sensors, proximity of obstacles around the first fixture plate.

17. The method of claim 11, comprising:
maintaining, by the at least one controller, positioning between the first and second fixture plates:
reading, by the at least one controller, the first and second sensors;
computing, by the at least one controller, a pose of the second transport vehicle in a frame of the second fixture plate;
transforming, by the at least one controller, the pose from the frame of the second fixture plate into a frame of the first transport vehicle as a lead vehicle;
calculating, by the at least one controller, a pose error of the second transport vehicle for motion control;
generating, by the at least one controller, a motion control value to minimize the pose error toward zero; and
operating, by the at least one controller using the motion control value, the second transport vehicle.

18. The method of claim 11, comprising calculating, by the at least one controller, a pose error of the second fixture plate.

19. The method of claim 18, comprising:
generating, by the at least one controller, a motion control signal of the number of transport vehicles to minimize the pose error;
changing, by the at least one controller and based on the pose error, a new velocity of the second transport vehicle; and
determining, by the at least one controller, whether the new velocity is within constraints.

20. A fixturing system, comprising:
a first autonomous transport vehicle;
a first fixture plate;
a first joint coupling the first fixture plate to the first autonomous transport vehicle, the first fixture plate including a first number of sensors configured to sense observable conditions related to the first fixture plate, including a first position sensor disposed at the first joint, the first joint enabling pivoting of the first fixture plate relative to the first autonomous transport vehicle;

a second autonomous transport vehicle;

a second fixture plate;

a second joint coupling the second fixture plate to the second autonomous transport vehicle, the second fixture plate including a second number of sensors configured to sense observable conditions related to the second fixture plate, including a second position sensor disposed at the second joint, the second joint enabling pivoting of the second fixture plate relative to the second autonomous transport vehicle;

at least one linking system on the first and second fixture plates configured to align the first fixture plate with the second fixture plate in one of a number of alternate orientations; and at least one controller on at least one of the first fixture plate and the second fixture plate and configured to read the first and second position sensors; to modify operation of at least one of the first and second autonomous transport vehicles in response to a change in a position of at least one of the first and second joints; and to compensate for transport variations to maintain a consistent support of the payload by locating the first and second fixture plates relative to each other, wherein the at least one controller on at least one of the first fixture plate and the second fixture plate communicates with the first and second controllers on the first and second autonomous transport vehicles, respectively.

* * * * *